(12) United States Patent
Nachenberg et al.

(10) Patent No.: US 8,239,944 B1
(45) Date of Patent: Aug. 7, 2012

(54) REDUCING MALWARE SIGNATURE SET SIZE THROUGH SERVER-SIDE PROCESSING

(75) Inventors: Carey S. Nachenberg, Northridge, CA (US); Kent E. Griffin, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1043 days.

(21) Appl. No.: 12/058,427

(22) Filed: Mar. 28, 2008

(51) Int. Cl.
*H04L 29/06* (2006.01)

(52) U.S. Cl. ........... 726/23; 726/22; 726/24; 726/25; 726/26; 726/27; 713/187; 713/188; 713/150

(58) Field of Classification Search .................. None
See application file for complete search history.

(56) References Cited

U.S. PATENT DOCUMENTS

| | | | |
|---|---|---|---|
| 5,951,698 A * | 9/1999 | Chen et al. | 714/38.1 |
| 7,290,282 B1 * | 10/2007 | Renert et al. | 726/24 |
| 7,454,418 B1 * | 11/2008 | Wang | 1/1 |
| 7,865,965 B2 * | 1/2011 | Kramer et al. | 726/30 |
| 7,895,659 B1 * | 2/2011 | Cusmariu | 726/25 |
| 7,900,255 B1 * | 3/2011 | Mayr et al. | 726/23 |
| 7,917,955 B1 * | 3/2011 | Spurlock et al. | 726/24 |
| 8,028,338 B1 * | 9/2011 | Schneider et al. | 726/24 |
| 8,087,086 B1 * | 12/2011 | Lai et al. | 726/24 |
| 2007/0094654 A1 * | 4/2007 | Costea | 717/168 |
| 2007/0180529 A1 * | 8/2007 | Costea et al. | 726/24 |
| 2009/0282476 A1 * | 11/2009 | Nachenberg et al. | 726/22 |
| 2009/0297048 A1 * | 12/2009 | Slotine et al. | 382/224 |
| 2009/0328221 A1 * | 12/2009 | Blumfield et al. | 726/24 |
| 2010/0313270 A1 * | 12/2010 | Kim et al. | 726/24 |
| 2011/0055123 A1 * | 3/2011 | Kennedy | 706/12 |

* cited by examiner

*Primary Examiner* — Syed A. Zia
(74) *Attorney, Agent, or Firm* — Fenwick & West LLP

(57) ABSTRACT

A server provides a reduced set of malware signatures to clients. The reduced set of malware signatures has the same scope of coverage as a comprehensive set of malware signatures stored on the server, but with a higher rate of false positive detections. The server receives signature detection event reports from the clients. A signature detection event report identifies the signature in the reduced set that was detected, and includes information describing the suspicious entity in which the signature was detected. Upon receiving a signature detection event report from a client, the server evaluates the information describing the suspicious entity using one or more signatures in the comprehensive set to determine whether the signature detection event is a false positive or a legitimate malware detection. The security server provides the result of the evaluation to the client from which the report was received.

16 Claims, 6 Drawing Sheets

US 8,239,944 B1

REDUCING MALWARE SIGNATURE SET SIZE THROUGH SERVER-SIDE PROCESSING

BACKGROUND OF THE INVENTION

1. Field of the Invention

This invention pertains in general to computer security and in particular to the identification of malware using malware signatures.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Security computer systems and software for counteracting malware typically operate by seeking to identify malware signatures in entities. Malware signatures contain data describing characteristics of malware and can be used to determine whether an entity such as a computer file or a software application contains malware. Typically, a set of malware signatures is generated by a provider of security software and deployed to security software on clients. This set of malware signatures is then used by the security software to detect malware on the clients.

The amount of malware to which a client can be exposed in computing environments continues to increase over time. Consequently, the size of the set of malware signatures that must be deployed to clients is also growing. However, a large set of malware signatures consumes computing resources at the clients, such as disk and memory resources, and also slows client-side malware scans.

Accordingly, there is a need in the art for decreasing the size of the set of malware signatures deployed to clients without compromising the ability to detect malware on the clients.

BRIEF SUMMARY

The above and other needs are met by methods and computer-readable storage media for evaluating a signature detection event. Embodiments of a method comprise receiving, from a client, a signature detection event report indicating a detection of a malware signature in association with an entity, the signature detection event report comprising data describing the entity. Embodiments of the method further comprise evaluating whether the signature detection event is a false positive signature detection event based on the data describing the entity and reporting to the client whether the signature detection event is a false positive signature detection event.

Embodiments of a method also comprise receiving a reduced set of malware signatures and generating a signature detection event report identifying a malware signature in the reduced set and including data describing a suspicious entity associated with the malware signature. Embodiments of this method further comprise receiving an evaluation of whether a signature detection event associated with the signature detection event report is a false positive signature detection event and suppressing the signature detection event responsive to the evaluation indicating that the signature detection event is a false positive signature detection event.

Embodiments of a computer-readable storage medium comprise a reporting module configured to receive, from a client, a signature detection event report indicating a detection of a malware signature in association with an entity, the signature detection event report comprising data describing the entity, and configured to report, to the client, whether the signature detection event is a false positive signature detection event. Embodiments of the computer-readable storage medium further comprise an evaluation module configured to evaluate whether the signature detection event is a false positive signature detection event based on the data describing the entity.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
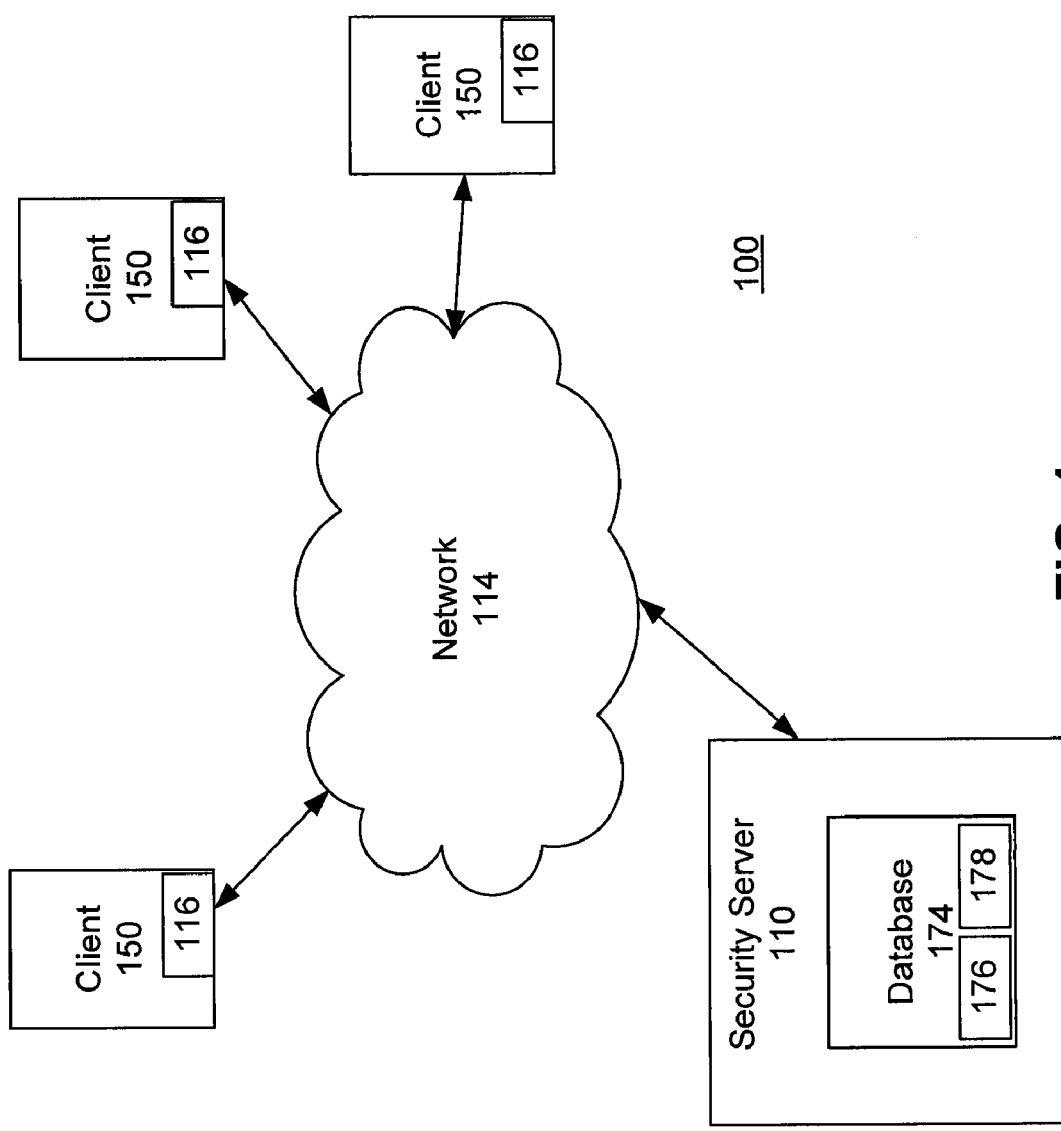
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

The security server 110 interacts with the clients 150 via the network 114. The security server 110 includes a database 174 storing malware signatures and entity status data used to detect malware. A malware signature includes one or more characteristics such as a pattern or a heuristic that is used to identify malware. The characteristics can include hashes identifying files or parts of files, heuristics identifying suspicious behaviors, and patterns found within files associated with malware and/or in memory after malware is executed.

The database 174 stores a comprehensive set of malware signatures 176 that detect malware with a low rate of false positive detections, and a reduced set of malware signatures 178 that detect malware with a relatively high rate of false positive detections. The reduced set of malware signatures 178 contains a smaller number of malware signatures than does the comprehensive set 176, but the signatures in the reduced set detect multiple types of malware. Thus, the reduced set of signatures provides for comprehensive detection of malware, and generally provides for the same scope of detection as the comprehensive set, albeit with a higher rate of false positive malware detections. For example, 1% of the malware detections by signatures in the reduced set 178 might be false positives while the false negative detection rate of the reduced set signatures might be nearly zero just like the detection rate provided by the comprehensive set signatures. A false positive signature detection event is a detection of a malware signature in connection with an entity that is not malware, i.e. an innocuous entity.

The security server 110 provides the reduced set of malware signatures 178 to the clients 150. In addition, the security server 110 receives signature detection event reports from the clients 150. A signature detection event report identifies the signature in the reduced set 178 that was detected, and includes information describing the suspicious entity in which the signature was detected. The term "suspicious entity", as used herein, refers to an entity such as a software application or computer file suspected to contain malware.

Upon receiving a signature detection event report from a client 150, the security server 110 evaluates the information describing the suspicious entity using one or more of the signatures in the comprehensive set 176 and/or other information to determine whether the signature detection event is a false positive or a legitimate malware detection. The security server 110 provides the result of the evaluation to the client 150 from which the report was received.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

Each of the clients 150 executes a security module 116 to detect suspicious entities containing malware. The security module 116 receives the reduced malware signature set 178 from the security server 170. Further, the security module 116 uses the reduced set of malware signatures 178 to identify signature detection events involving entities at the client 150. Upon identifying a detection event, the security module 116 transmits a signature detection event report to the security server 110 for evaluation. The security module 116 receives the results of the signature detection event evaluation from the security server 110. If the evaluation indicates that the event is false positive, the security module 116 suppresses or otherwise disregards the event. If the evaluation indicates that the event is a legitimate malware detection (i.e., not a false positive), the security module 116 reports the malware detection.

Using the comprehensive set of malware signatures 176 and other information stored at the security server 110 to evaluate signature detection event reports provides a mechanism for reducing the set of signatures deployed to the clients 150, and reducing the frequency of providing signature updates to the clients, while still providing for comprehensive client-side malware detection. This approach leverages the processing power of the security server 110 to compensate for the increased rate of false positive signature detection events associated with the reduced set of signatures 178. Thus, the approach is well-suited to computing environments where it is not practical or desirable to provide a full set of comprehensive signatures to the clients 150. In addition, this approach allows for more frequent updates of signatures and other malware detection techniques at the security server 110 without requiring corresponding updates to the clients 150, and allows the server-side malware detection signatures and techniques to be developed without constraints based on client-side resource consumption.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
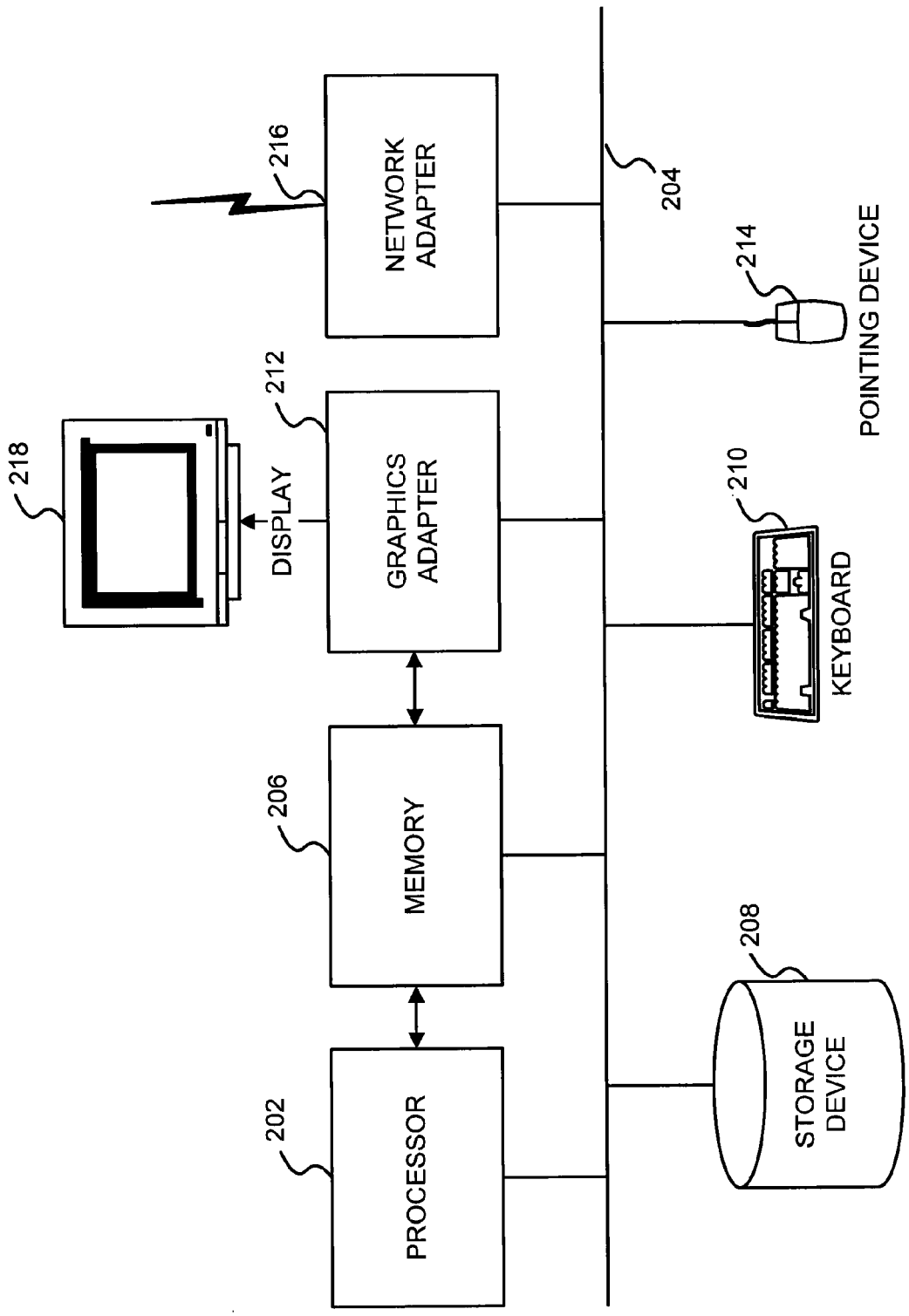
FIG. 2 is a high-level block diagram illustrating a typical computer 200 for use as a security server 110 or client 150.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
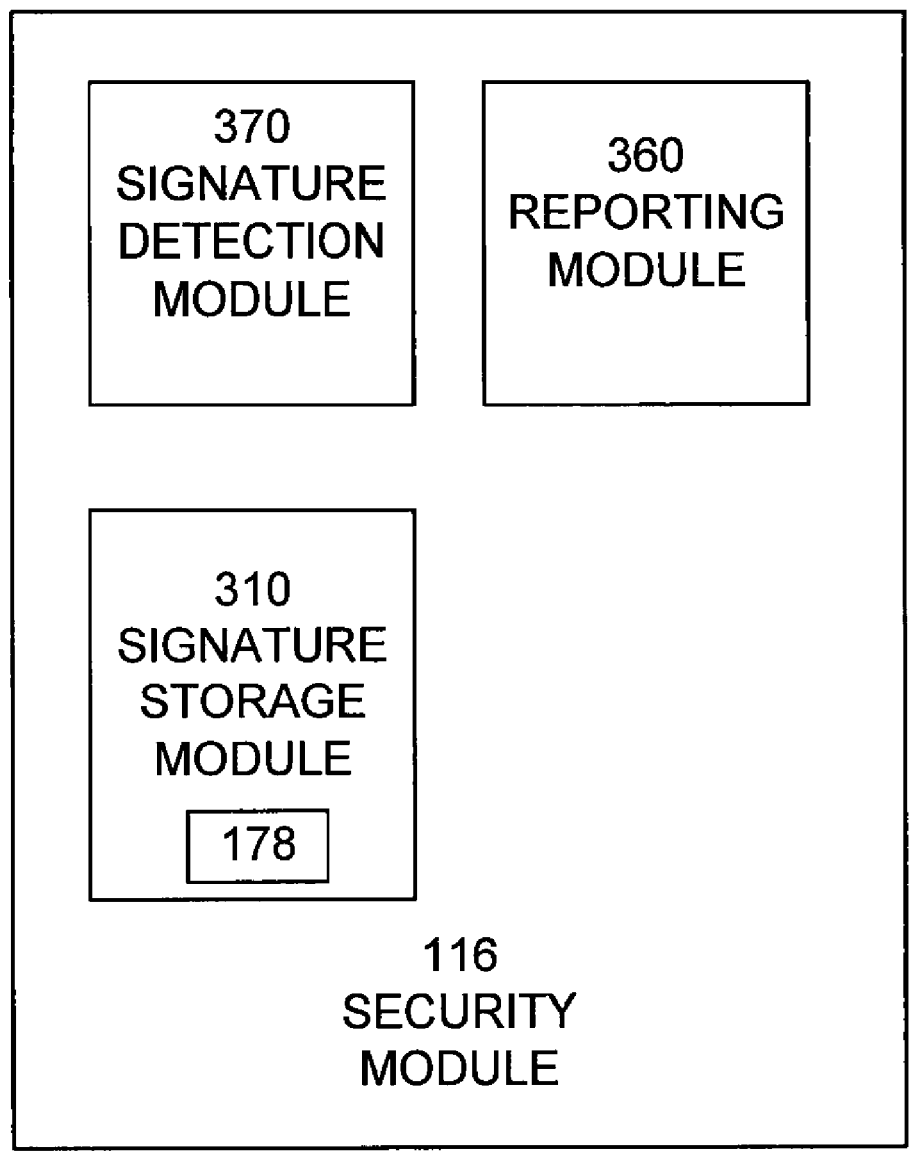
FIG. 3 is a high-level block diagram illustrating a detailed view of the security module 116 of a client 150 according to one embodiment.

FIG. 3 is a high-level block diagram illustrating a detailed view of the security module 116 of a client 150 according to one embodiment. In some embodiments, the security module 116 is incorporated into an operating system executing on the client 150 while in other embodiments the security module 116 is a standalone application or part of another product. As shown in FIG. 3, the security module 116 includes multiple modules. Those of skill in the art will recognize that other embodiments of the security module 116 can have different and/or other modules than the ones described here, and that the functionalities can be distributed among the modules in a different manner.

A signature storage module 310 stores a set of malware signatures received from the security server 110. As mentioned above, in one embodiment the signature storage module 310 stores the reduced set of malware signatures 178. In some embodiments, the signature storage module 310 may store malware signatures received from sources other than the security server 110 and/or other data used to detect malware.

In one embodiment, the malware signatures in the reduced signature set 178 specify characteristics which are common to multiple variations and/or different types of malware. For instance, a malware signature can specify a pattern that is found in multiple different types of malware, or describe a behavior in which several different types of malware engage. The signatures in the reduced set 178 optimally produce no false negative detections for known threats. In other words, the signatures will accurately detect all of the known types of malware for which they are designed to detect. The signatures in the reduced signature set 178 can generate a high rate of false positive malware detections because the patterns, behaviors, and/or other characteristics specified by the signatures might also occasionally be found in innocuous (i.e., non-malicious) entities. However, the vast majority of entities examined by the security module 116 will not trigger a detection and subsequently will not trigger interactions with the security server 110.

A signature detection module 370 detects suspicious entities based on the malware signatures in the reduced signature set 178. In one embodiment, the signature detection module 370 scans the storage device 208 or memory 206 associated with the client 150 to determine whether the malware signatures are found within the entities installed or stored on the storage device 208 or memory 206. In addition, the signature detection module 370 monitors the behaviors of the entities on the client 150 to determine whether any of the behaviors satisfy behaviors specified in the malware signatures.

The signature detection module 370 determines that a signature detection event occurs if a malware signature is found within an entity an/or an entity engages in a behavior specified by a signature. Upon determining that a signature detection event has occurred, an embodiment of the signature detection module 370 quarantines the suspicious entity involved in the event to prevent the entity from damaging the client 150. The suspicious entity may be quarantined, for example, by configuring the client 150 to prohibit execution of it and/or taking another action to prevent any malicious code in the suspicious entity from causing harm.

The reporting module 360 communicates with the security server 110 via the network 114. The reporting module 360 receives the reduced signature set 178 from the security server 110. The reporting module 360 also reports signature detection events to the security server 110. A signature detection event report includes an identifier of the malware signature involved in the signature detection event and data describing the suspicious entity in which the signature was detected.

The data describing the suspicious entity includes information that allows the security server 110 to determine whether the malware detection is a false positive. If the suspicious entity is a small file or other small discrete collection of data, the reporting module 360 can include the entire suspicious entity in the signature detection event report. Similarly, if the suspicious entity is an executable file, the reporting module 360 can include the unpacked code section of the file in the report. The reporting module 360 can further include one or more hashes of the suspicious entity and the portion or portions of the entity in which the signature was detected. Additionally, the reporting module 360 can include information about the entity, such as the name of the entity, the location on the client where the entity resides (e.g., the directory path of a file), and the entity's date of creation or last modification.

The reporting module 360 receives results of the signature detection event evaluations from the security server 110. If the signature detection event evaluation indicates that a signature detection event is a false positive signature detection event, the reporting module 360 communicates instructions to the signature detection module 370 to suppress (e.g., to ignore) the signature detection event. Thus, the signature detection module 370 will release the entity from quarantine and/or undo other actions performed when the entity was declared suspicious.

If the signature detection event evaluation indicates that the signature detection event is not a false positive signature detection event (i.e., is a legitimate detection), the reporting module 360 remediates the client 150, for example, by removing the suspicious entity and/or repairing corrupted entities on the client 150. The reporting module 360 may perform additional actions, such as alerting a user of the client 150 and logging the detection event.

Figure 4:
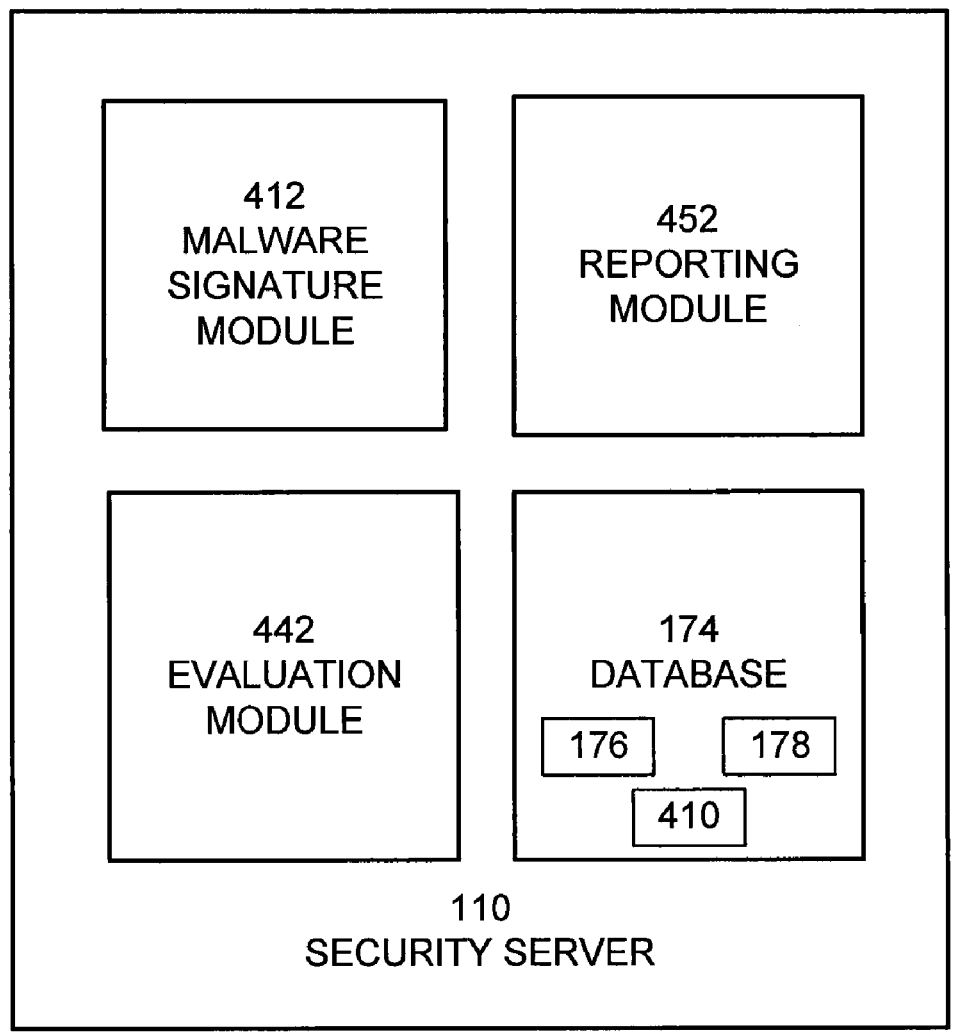
FIG. 4 is a high-level block diagram illustrating a detailed view of the security server 170 according to one embodiment.

FIG. 4 is a high-level block diagram illustrating a detailed view of the security server 110 according to one embodiment. As shown in FIG. 4, the security server 110 includes several modules. Those of skill in the art will recognize that other embodiments can have different and/or other modules than the ones described here, and that the functionalities can be distributed among the modules in a different manner. In addition, the functions ascribed to the security server 110 can be performed by multiple servers.

A reporting module 452 communicates with the clients 150 via the network 114. The reporting module 452 also receives signature detection event reports from the clients 150. The reporting module 452 provides evaluations of the reported signature detection events to the clients 150. The reporting module 452 further provides the reduced signature set 178 to the clients 150.

The database 174 stores malware signatures including the comprehensive signature set 176 and the reduced signature set 178. The malware signatures in the comprehensive signature set 176 are designed to identify malware entities with a very low rate of false positive and false negative detections. In one embodiment, the malware signatures in the database 174 are created by a security software developers.

In one embodiment, the database 174 stores entity status data 410 that are used to evaluate signature detection events. The entity status data 410 describe aspects of entities (e.g., files) such as the entities' popularity and reputation. Generally, the popularity of an entity indicates the frequency at which the entity is found on the clients 150. For example, an executable file that is part of a popular word processing program will be found on the clients 150 with great frequency. The reputation of an entity indicates whether the entity is likely to contain malware, and can be based on factors such as the web sites that host the entity, the frequency of malware detections on clients 150 at which the entity is commonly found, and the web browsing habits of the users of the clients at which the entity is commonly found. For example, an entity found on clients 150 at which malware is frequently detected may have a low reputation, which indicates that the entity might be malware.

An evaluation module 442 evaluates signature detection events reported by the clients 150 to determine whether they are false positive signature detection events. The evaluation module 442 obtains the data describing the suspicious entity from a signature detection event report. The evaluation module 442 uses the signatures stored in the comprehensive signature set 176 and/or entity status data 410 to evaluate the data describing the suspicious entity and determine whether the report is a false positive (i.e., to determine whether the suspicious entity contains malware). For example, if a signature from the comprehensive signature set 176 is found in the data describing the suspicious entity, then the evaluation module 442 determines that the report is not a false positive. Similarly, if the entity status data indicates that the suspicious entity is very popular, then the evaluation module 442 may determine that the report is a false positive because it is unlikely that such a popular entity would contain malware.

In some embodiments, the evaluation module 442 identifies a subset of the comprehensive signatures 176 to use in evaluating a specific signature detection event report. This identification can be performed based on the reduced signature that triggered the report. For example, if the signature detection event report indicates that reduced signature A was detected in the suspicious entity, the evaluation module 442 can determine that signature A corresponds to malware threats B and C. Therefore, the evaluation module 442 identifies the signatures in the comprehensive set 176 designed to detect malware threats B and C, and scans the data describing the suspicious entity using only the identified comprehensive signatures.

The evaluation module 442 communicates the results of the evaluation to the reporting module 452. In some embodiments, the evaluation module 442 may report the signature detection event to an administrator of the security server for further evaluation.

Figure 5:
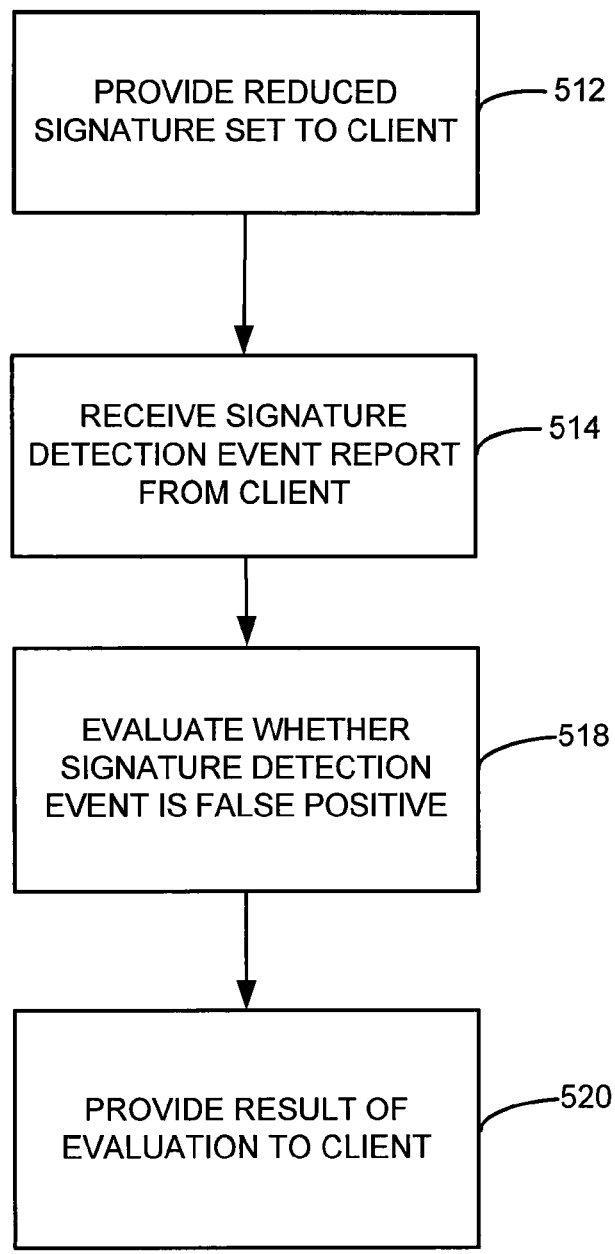
FIG. 5 is a flowchart illustrating steps performed by the security server 170 to provide evaluations of signature detection events to a client 150 according to one embodiment.

FIG. 5 is a flowchart illustrating steps performed by the security server 110 to provide evaluations of signature detection events to a client 150 according to one embodiment. Other embodiments perform the illustrated steps in different orders, and/or perform different or additional steps. Moreover, some of the steps can be performed by engines or modules other than the security server 110.

The security server 110 provides 512 a reduced signature set to the client 150. The security server 110 receives 514 a signature detection event report including the malware signature involved in the signature detection event and data describing the suspicious entity identified in the signature detection event. The security server 110 evaluates 518 whether the signature detection event is a false positive signature detection event by scanning the data describing the suspicious entity using the signatures in the comprehensive signature set 176. The security server 170 provides 520 the results of this evaluation to the client 150.

Figure 6:
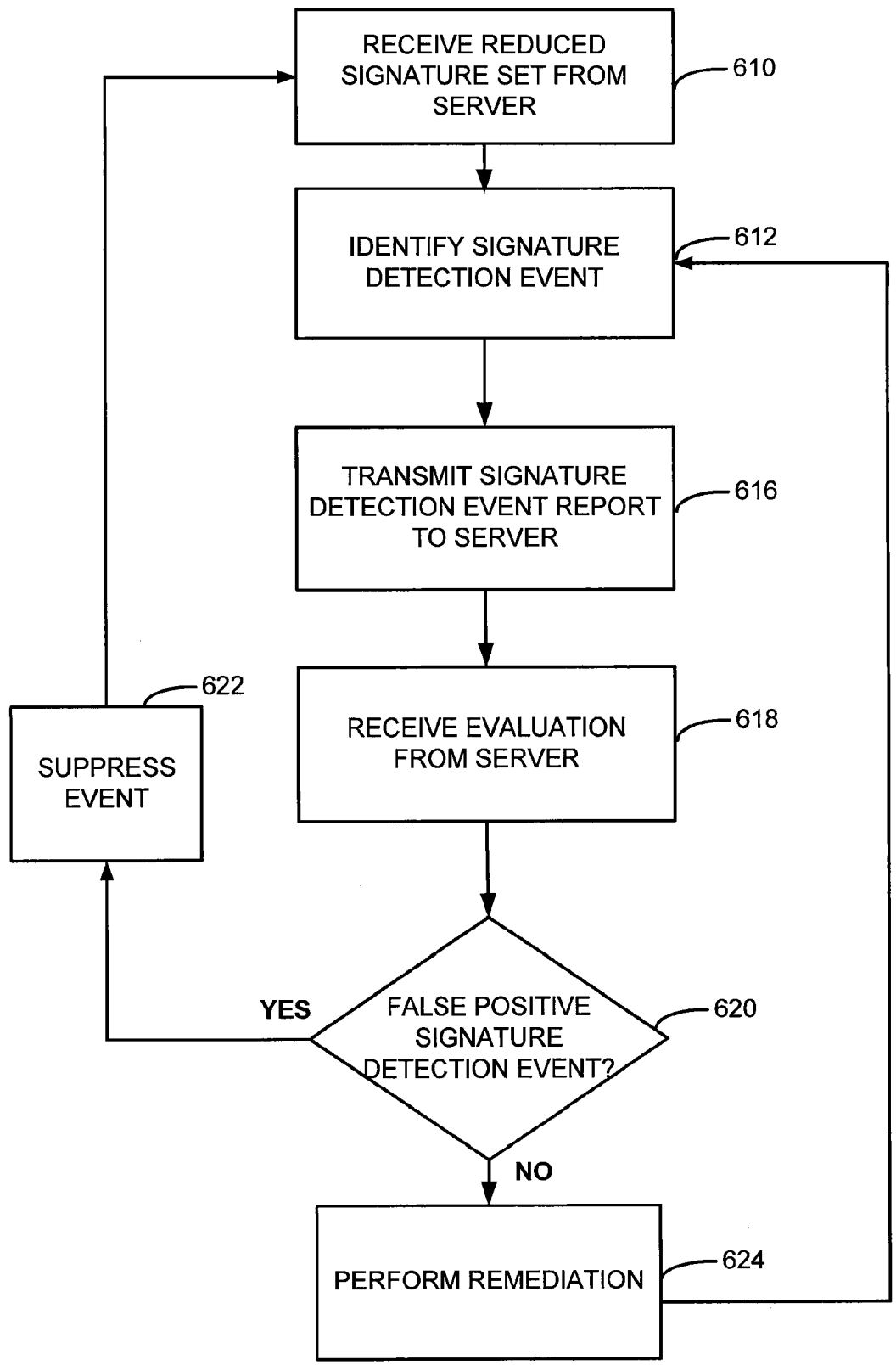
FIG. 6 is a flowchart illustrating steps performed by the security module 116 on the client 150 to detect and evaluate signature detection events according to one embodiment.

FIG. 6 is a flowchart illustrating steps performed by the security module 116 on the client 150 to detect and evaluate signature detection events according to one embodiment. Other embodiments perform the illustrated steps in different orders, and/or perform different or additional steps. Moreover, some of the steps can be performed by engines or modules other than the security module 116.

The security module 116 receives 610 a reduced signature set 310 including one or more malware signatures from the security server 110. The security module 116 identifies 612 a signature detection event based on the identification of a malware signature in an entity associated with the client 150. The security module 116 transmits 616 the signature detection event report identifying the malware signature involved in the signature detection event and data describing the suspicious entity in which the signature was detected to the security server 110. The security module 116 receives 618 an evaluation of the signature detection event from the security server 110, the evaluation indicating whether the signature detection event is a false positive signature detection event. If 620 the signature detection event is a false positive signature detection event, the security module 116 suppresses 622 the event at the client 150. If the signature detection event is not a false positive signature detection event, the security module 116 performs 624 a remediation of the client 150, such as removing the suspicious entity from the client.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of evaluating a signature detection event, comprising:
using a computer to perform steps comprising:
providing a reduced set of malware signatures to a client, the signatures in the reduced set of malware signatures generating a greater rate of false positive malware detections than signatures in a comprehensive set of malware signatures;
receiving from the client a signature detection event report indicating a detection of a malware signature in the reduced set of malware signatures in association with an entity, the signature detection event report comprising data describing the entity;
examining the data describing the entity using the comprehensive set of malware signatures to determine whether the signature detection event is a false positive signature detection event; and
reporting to the client whether the signature detection event is a false positive signature detection event.

2. The method of claim 1, wherein the reduced set of malware signatures provides for the same scope of malware detection as the comprehensive set of malware signatures.

3. The method of claim 1, wherein the reporting comprises:
reporting to the client that the signature detection event is a false positive detection event responsive to the examination of the data using the comprehensive set of malware signatures not detecting signatures in the set in the data.

4. The method of claim 1, wherein the reporting comprises:
reporting to the client that the signature detection event is not a false positive detection event responsive to the examination of the data using the comprehensive set of malware signatures detecting a signature in the set in the data.

5. The method of claim 1, wherein the examining comprises:

identifying reputation data indicating a reputation associated with the entity; and evaluating whether the signature detection event is false positive signature detection event responsive to the reputation data.

6. The method of claim 1, wherein the examining comprises:

identifying popularity data indicating a popularity of the entity; and evaluating whether the signature detection event is a false positive signature detection event responsive to the popularity data.

7. A non-transitory computer-readable storage medium having executable computer modules for evaluating a signature detection event, comprising:

a reporting module configured to:

provide a reduced set of malware signatures to a client, the signatures in the reduced set of malware signatures generating a greater rate of false positive malware detections than signatures in a comprehensive set of malware signatures;

receive from the client a signature detection event report indicating a detection of a malware signature in the reduced set of malware signatures in association with an entity, the signature detection event report comprising data describing the entity, and configured to report to the client whether the signature detection event is a false positive signature detection event; and an evaluation module configured to examine the data describing the entity using the comprehensive set of malware signatures to determine whether the signature detection event is a false positive signature detection event.

8. The computer-readable storage medium of claim 7, wherein the reduced set of malware signatures provides for the same scope of malware detection as the comprehensive set of malware signatures.

9. The computer-readable storage medium of claim 7, wherein the reporting module is further configured to:

report to the client that the signature detection event is a false positive detection event responsive to the examination of the data using the comprehensive set of malware signatures not detecting signatures in the set in the data.

10. The computer-readable storage medium of claim 7, wherein the reporting module is further configured to:

report to the client that the signature detection event is not a false positive detection event responsive to the examination of the data using the comprehensive set of malware signatures detecting a signature in the set in the data.

11. The computer-readable storage medium of claim 7, wherein the reporting module is further configured to:

identify reputation data indicating a reputation associated with the entity; and evaluate whether the signature detection event is false positive signature detection event responsive to the reputation data.

12. The computer-readable storage medium of claim 7, wherein the reporting module is further configured to:

identify popularity data indicating a popularity of the entity; and evaluate whether the signature detection event is a false positive signature detection event responsive to the popularity data.

13. A method of evaluating a signature detection event, comprising:

using a computer to perform steps comprising:

receiving a reduced set of malware signatures, the signatures in the reduced set of malware signatures generating a greater rate of false positive malware detections than signatures in a comprehensive set of malware signatures;

generating a signature detection event report identifying a malware signature in the reduced set and including data describing a suspicious entity associated with the malware signature;

receiving an evaluation of whether a signature detection event associated with the signature detection event report is a false positive signature detection event, wherein the evaluation is using the comprehensive set of malware signatures; and suppressing the signature detection event responsive to the evaluation indicating that the signature detection event is a false positive signature detection event.

14. The method of claim 13, further comprising:

providing the signature detection event report to a server.

15. The method of claim 13, wherein the reduced set of malware signatures provides for the same scope of malware detection as the comprehensive set of malware signatures.

16. The method of claim 13, wherein the data describing the suspicious entity comprise at least a portion of a computer file in which the malware signature was detected.

* * * * *